United States Patent [19]

Fecteau et al.

[11] Patent Number: 5,410,700
[45] Date of Patent: Apr. 25, 1995

[54] COMPUTER SYSTEM WHICH SUPPORTS ASYNCHRONOUS COMMITMENT OF DATA

[75] Inventors: Jean G. Fecteau, Toronto, Canada; Joseph M. Gdaniec, Vestal; James P. Hennessy, Endicott, N.Y.; John F. MacDonald; Damian L. Osisek, both of Vestal, N.Y.

[73] Assignee: International Business Machines Corporation, Armonk, N.Y.

[21] Appl. No.: 754,843

[22] Filed: Sep. 4, 1991

[51] Int. Cl.⁶ ............................................. G06F 13/00
[52] U.S. Cl. ............................. 395/700; 364/DIG. 1; 364/280; 364/263
[58] Field of Search ................ 395/650, 575, 700, 200

[56] References Cited

U.S. PATENT DOCUMENTS

| | | | |
|---|---|---|---|
| 4,811,216 | 3/1989 | Bishop | 364/200 |
| 5,063,494 | 11/1991 | Davidowski | 395/800 |
| 5,163,131 | 11/1992 | Row et al. | 395/200 |
| 5,165,031 | 11/1992 | Pruul et al. | 395/575 |
| 5,197,148 | 3/1993 | Blount | 395/575 |

OTHER PUBLICATIONS

U.S. Patent App., S.N. 07/525,429, Filed May 16, 1990, "Asynchronous Resynchronization of a Commit Procedure", K. H. Britton et al.

*Primary Examiner*—Kevin A. Kriess
*Attorney, Agent, or Firm*—Arthur J. Samodovitz

[57] ABSTRACT

A computer system for processing and committing data comprises a processor, an external storage device such as DASD or tape coupled to the processor, and a working memory such as RAM. An application program updates data in the working memory and then requests that the data be committed, i.e. written to the external storage device. In response, an operating system function determines which data or blocks have been changed and supplies to an I/O service an identification of the changed data or blocks to cause the I/O service to write the changed data or blocks to the external storage device. Thus, the application program is not burdened with the management of the I/O. The operating system permits the program to continue with other processing while the data is being written from the working memory to the external storage device. As a result, the program need not wait while the data is written to the external storage. Also, because little time is required of the program in the commit process, the program can frequently request commits. With frequent commits, there is less chance that the data will have been written to back-up memory or back-up storage (due to an overload of the working memory) between commits, and as a result, time will not be required to read the data from the back-up memory or storage into the working memory en route to the application program's external storage. Also, the frequent commits reduce the chance of overloading the I/O subsystem.

18 Claims, 7 Drawing Sheets

COMPUTER SYSTEM WHICH SUPPORTS ASYNCHRONOUS COMMITMENT OF DATA

BACKGROUND OF THE INVENTION

The invention relates generally to computer systems, and deals more particularly with a computer operating system which supports asynchronous commitment of data updates.

In some computer systems such as an IBM Multiple Virtual Storage/Enterprise Systems Architecture computer system, external storage devices such as Direct Access Storage Devices (DASD) are provided to store application program data. This computer system also includes virtual storage which is directly accessible by the application program. The virtual storage is storage that represents available storage for an application program and is addressable by the application program. The operating system and hardware correlate the virtual storage with actual storage that is available to the application program. The application program uses an operating system interface called "data-in-virtual" mapping interface to establish a correlation, known as a "mapping," between some set of blocks on the application's DASD and a corresponding set of locations in the application's virtual storage. This interface and the resultant mapping allow the application program to access data stored on the application's DASD without the need to request explicit I/O operations to load the data from or store the data to the application's DASD.

To update a set of mapped data, the application program simply references the mapped virtual storage pages which include the data. When a page of mapped virtual storage is first accessed in this manner, the operating system copies the data from the application's DASD into main storage (random access memory—"RAM") where it is available for manipulation by the application program. As is common for virtual storage systems, if the main storage is overloaded, the operating system may later move pages of virtual storage into other RAM which serves as a back-up or onto other "paging" DASD. This frees main storage (RAM) for other actively referenced pages of other application programs.

At various checkpoints during processing of the data in the virtual storage and at the end of processing, the application program requests that the data be committed, i.e. written onto DASD. The checkpoints at which an application program requests commit vary but often include the end of a transaction or fixed time intervals. In response to the commit request, the operating system copies the data from main storage if the data resides there into the mapped application program's DASD locations. If the data resides in either back-up RAM or paging DASD, the data must be first read into the main storage before being written into the mapped application program's DASD locations.

Immediately after the application program requests the commit and during the time that the data is being committed, i.e. written to the corresponding DASD, either directly from main memory or from back-up storage or paging DASD via main memory, the application program is suspended.

These operations require significant time with a corresponding delay to the application program. Also, if much data must be read from paging DASD and/or written to the application program's DASD at the time of commit, the I/O devices which are involved in this I/O operation may be overloaded. The result of such overloading is additional delay for the application program. When the operating system completes the commit operation, the operating system resumes the application program to continue with other work.

In some other virtual storage and real storage operating systems an application program actively manages I/O operations to DASD using read and write services of the operating system. To provide such management, the application program determines which pages have been changed (and therefore must be written to DASD) and identifies the changed pages to the read and write service. The read and write service often includes an initial validation phase in which the service validates the I/O request and a subsequent phase of actually reading or writing the data. In some prior art systems of this type, during the initial validation phase, the application program is suspended, but during the actual reading or writing phase, the application program is not suspended. While this asynchronous operation of the application program during the actual reading and writing of data reduces the investment of time by the application in the commit process, the application program must still invest considerable time in managing the read and write service.

Accordingly, a general object of the present invention is to provide an operating system that improves the efficiency of application programs that utilize the operating system and the operating system itself during the process of committing data.

Another object of the present invention is to provide a computer system of the foregoing type which avoids overloading I/O devices during commit processing, reduces the need to copy data from main storage to paging DASD, and reduces the need to copy data from paging DASD during commit processing.

SUMMARY OF THE INVENTION

The invention resides in a computer system for processing and committing data. The computer system comprises a processor, an external storage device such as DASD or tape coupled to the processor, and a working memory such as RAM located internally or tightly coupled to the processor or at least accessible by the processor with greater speed than the processor can access the external storage device. An application program updates data in the working memory and then requests that the data be committed, i.e. written to the external storage device. In response, an operating system function determines which data has been changed since the last commit request, and supplies to an I/O service an identification of the changed data or blocks to cause the I/O service to write the changed data or blocks to the external storage device. Thus, the application program is not burdened with managing the I/O. The operating system permits the program to continue with other processing while the data is being written to the external storage device. As a result, the program need not wait while the data is written to the external storage. Also, because little time is required of the program in the commit process, the program can frequently request commits. With frequent commits, there is less chance that the data will have been written to back-up memory or storage (due to an overload of the working memory) between commits, and as result, time will not be required to read the data from the back-up memory or back-up storage into the working memory en route to the application program's external storage. Also, the frequent commits reduce the chance of overloading the I/O subsystem.

DETAILED DESCRIPTION OF THE PREFERRED EMBODIMENTS

Figure 1:
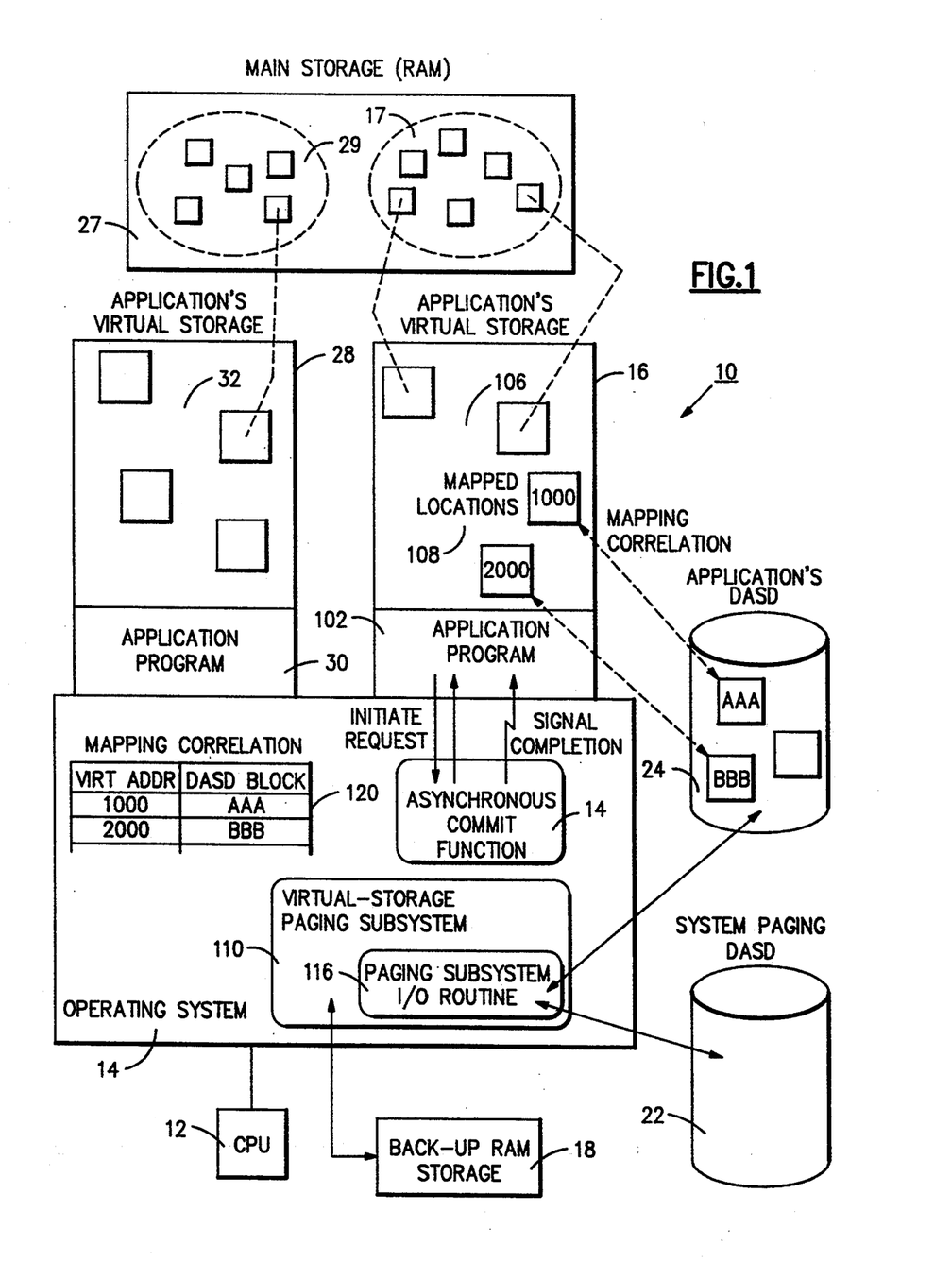
FIG. 1 is a block diagram of a computer system which supports asynchronous and synchronous commit functions according to the present invention.

Referring to the figures in detail wherein like reference numerals indicate like elements throughout the several views, FIG. 1 illustrates a computer system, generally designated 10 embodying the present invention. Computer system 10 comprises a CPU 12, an operating system 14, application's virtual storage 16, application DASD 24, back-up storage 18, and system paging DASD 22. Virtual storage 16 contains an application program 102 (which was loaded from a disk, tape, or other computer readable medium) and working memory 106 for the application program. The working memory includes a set of locations 108 that are mapped to application's DASD 24. The mapping correlation that exists between the mapped virtual storage pages 108 and the application program's DASD 24 is established using an operating system mapping interface. Application program 102 can use this interface once at the beginning of execution or thereafter to specify a collection of virtual storage pages to be mapped, and for each such page, the application program's DASD block to be associated with the page. In response to this interface, the operating system 14 records the correspondence between virtual addresses and DASD blocks in a table 120 accessible in operating system storage. This table may be a separate table dedicated to this purpose, or may be adjunct information in the tables that the operating system 14 normally maintains to manage virtual storage. An (I/O) virtual storage paging subsystem 110 accesses the relevant mapping information from table 120 when initiating operation of the I/O subsystem to read blocks from the application program's DASD when a copy of a mapped virtual storage page does not already exist in main storage 27, back-up storage 18 or system paging DASD 22. Also, the virtual storage passing subsystem 110 uses this table 120 to initiate I/O operations to write blocks to the application program's DASD during a commit operation when the copy of a virtual storage page that exists in main storage 27, back-up storage 18 or system paging DASD 22 is more recent than the copy on the application program's DASD 24. Because of this mapping, the application program 102 accesses application's DASD 24 merely by using processor instructions, and does not issue explicit I/O requests. Main storage (RAM) 27 includes a collection of blocks 17 containing pages of virtual storage 16 which are being actively used by the application program 102. The operating system's virtual storage paging subsystem 110 manages the contents of main storage 27, back-up storage 18 and system paging DASD 22, and controls I/O to application DASD 24 and system paging DASD 22. FIG. 1 also illustrates another block 28 of virtual storage (with corresponding set of RAM blocks 29) which stores another application program 30 and provides associated working memory 32.

Operating system 14 is preferably programmed in executable form onto a computer readable medium such as a magnetic disk or tape, loaded into other memory of computer system 10 and executed on CPU 12 (or other CPUs not shown). Operating system 14 provides such standard functions as interprocess communications, timing services, abnormal end handling, accounting functions, and data-in-virtual services. In addition, operating system 14 is programmed according to the present invention to provide an efficient technique for committing data to application's DASD 24 as described in more detail below. Operating system 14 operates in a multi-tasking mode such that various program functions execute on different program threads or streams of execution taking turns on CPU 12 (or other CPUs not shown). Application programs 102 and 30 are constrained to execute on a single or a small number of operating system threads.

Back-up RAM storage 18 is provided and is used by operating system 14 to store data from virtual storage of any application program such as application program 102 when another application program such as application program 30 needs additional main storage beyond that already provided to it. If the back-up storage is not present or is not adequate, then operating system 14 can store data from virtual storage to system paging DASD 22. Naturally, the I/O to system paging DASD 22 (and application's DASD 24) is slower than access to back-up storage 18 (or main storage 27). When operating system 14 wishes to write to the application's DASD 24 data which is not already resident in main storage 27, the operating system must first recall data from back-up storage 18 or system paging DASD 22.

Figure 2:
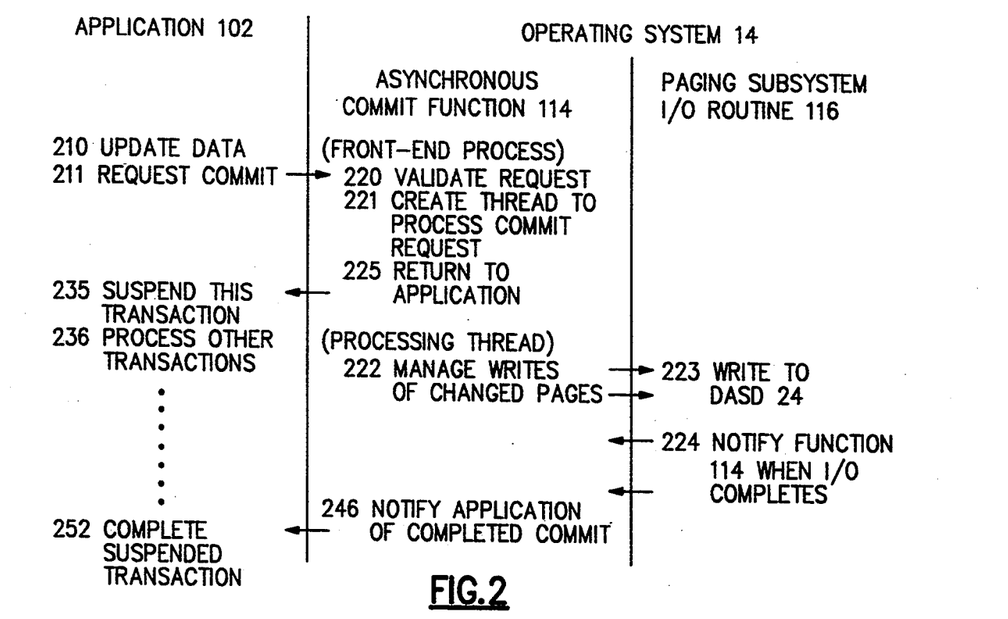
FIG. 2 is a flow chart which shows the steps and relative timing of an asynchronous commit function according to the present invention.

A relatively high level flowchart of the present invention is illustrated in FIG. 2. In step 210, application program 102 accesses data from application's DASD 24 by making a simple fetch, which data is then read into main storage 27 by the virtual storage paging subsystem 110. In step 210, application program 102 also updates the data in main storage 27. In step 211, application program 102 requests that the data be committed, i.e. copied to application's DASD 24, by calling an asynchronous commit function 114 (illustrated in FIG. 1). It should be noted that this request can be made at any time, before or at a traditional checkpoint in the application processing. If the commit request is made within a relatively short time after the data is processed, then it is likely that none of the data in main storage 27 will have been written by operating system 14 to back-up storage 18 or system paging DASD 22. As a result, the commit process will be expedited; it will not be necessary to read the data from system paging DASD 22 or back-up storage 18 into main storage 27 before being written to application's DASD 24. Also, such frequent commits avoid overload of the I/O devices 24 because the amount of data that must be written is relatively small. It should also be noted that operating system 14 does not suspend application program 102 during the bulk of commit processing, as described in more detail below, and therefore, the application program 102 can frequently request commits without incurring substantial delays. In step 220, the asynchronous commit function 114 validates the commit request by checking the parameter list and the addresses of the pages to be committed. A front-end process subfunction within the asynchronous commit function which received the commit request and validated the request is executing on the same thread as application program 102 which made the commit request. Consequently, while the subfunction is validating the commit request, the application program is not being executed and, in effect, is suspended. Next, the asynchronous commit function begins execution of another processing task or thread to carry out the commit processing (step 221), and then returns control to the application program 102 which requested the commit (step 225). At the point of return, the application suspends processing of the current transaction (step 235); however, it is free to perform other transactions (step 236). A "transaction" is an exchange between an application program and one of its users that accomplishes a particular action or result, for example, the entry of a customer's deposit in a bank account and the updating of the bank account. While the other transactions are being executed, the processing thread created at step 221 determines which pages contain the data that was changed since the last commit and calls the I/O subsystem, once per page, with an identification of each changed page to initiate the necessary I/O to application's DASD 24 (step 222). In the illustrated embodiment, the paging subsystem I/O routine 116 constructs a "channel program" to perform the requested I/O operation and queues the request on a queue of requests for the application's DASD 24 (step 223). When the DASD 24 is not currently busy performing an I/O operation, the paging subsystem I/O routine 116 removes a request from the queue of requests for the device and begins the I/O operation. When the I/O operation is complete, the DASD 24 signals the paging subsystem I/O routine 116 with an interruption. The interruption causes the paging subsystem I/O routine 116 to dequeue and begin the next request for the DASD (if any), and to notify the commit function 114 of the completion of its I/O request by creating an operating system thread to perform the I/O completion routine 800 shown in FIG. 8 (step 224). When this commit function has been completed, i.e. all the updated pages have been written to application's DASD 24, the asynchronous commit function signals the application program 102 (step 246) that the commit operation has been completed. In response, the application program may resume processing of the suspended transaction until completion (step 252) or until the resumed thread requests another commit. Thus, the asynchronous commit function 114 allows an application program to make productive use of the time during which a commit operation on behalf of one of its transactions is proceeding. During that time, the application program 102 is not burdened with managing the I/O operation and is free to process other transactions.

Operating system 14 also permits an application program to initiate multiple commit operations to be performed concurrently. In a transaction-processing application program which performs a separate commit operation for each transaction, such as application program 102, each transaction can be processed independently by the application. Just as the asynchronous commit function 114 permits other transactions to be executed while a commit operation proceeds, if a second transaction requires a commit operation, and the asynchronous commit function is currently processing a previous commit request, the second commit operation can be initiated and performed concurrently with the ongoing first commit operation by creating another processing thread for the writing of data for the second commit operation.

Figure 3:
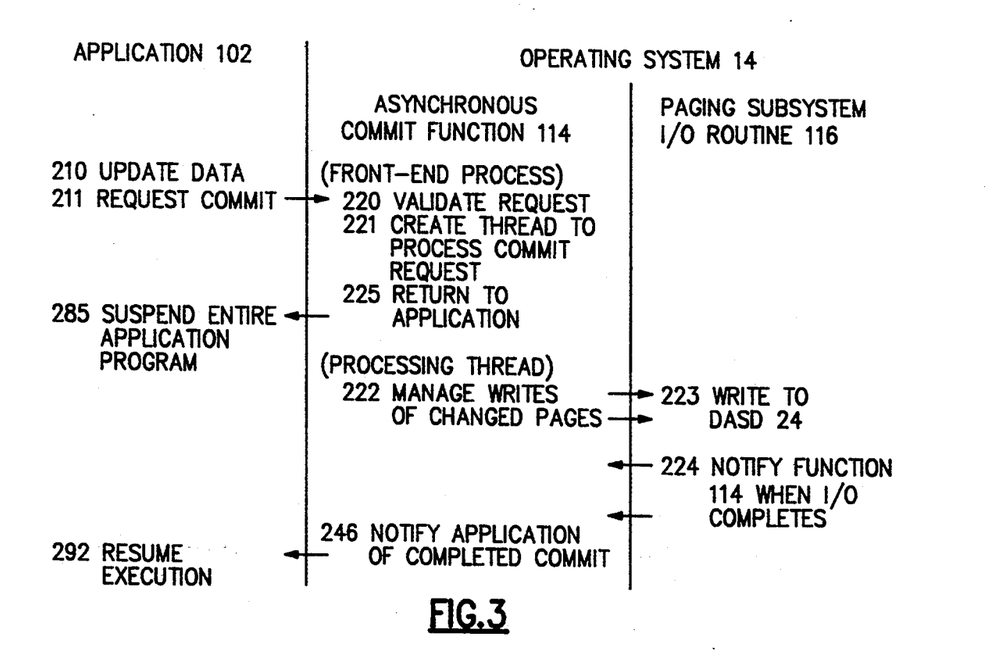
FIG. 3 is a flow chart which shows the steps and relative timing of a synchronous commit function which is supported by the present invention.

FIG. 3 is another flow chart illustrating use of the asynchronous commit function 114 by application program 102 to provide a synchronous commit procedure at check points (or other times). The synchronous procedure illustrated in FIG. 3 can advantageously be used in accordance with the present invention in combination with prior asynchronous commits. As noted above, the prior asynchronous commits reduce the likelihood that data from the application program 102's virtual storage 16 will have been written to back-up storage 18 or system paging DASD 22, or will overload the I/O devices 22 and 24. Steps 210–225 are the same as in FIG. 2. In step 210, application program 102 obtains the data from application's DASD 24 through virtual storage 16 and processes the data. In step 211, application program 102 calls the asynchronous commit function 114 to write the updated data from virtual storage 16 to application's DASD 24. In step 220, the asynchronous commit function validates the request, and in step 221 creates a new thread to process the commit request. In step 225, the asynchronous commit function returns to application program 102. However, at this time, application program 102 decides to suspend itself entirely, i.e. suspend all of its transaction processing, awaiting completion of the commit process (step 285). The application program "suspends" itself by entering into a wait state; in such a state, the operating system 14 does not execute it. Meanwhile, the processing thread created at step 221 manages the needed I/O operations (step 222). The I/O paging routine 116 copies the updated pages to application's DASD 24 in step 223 as described above, and notifies the asynchronous commit function 114 when the last write operation has been completed (step 224) as in FIG. 2. In response, the asynchronous commit function signals the application program 102 that the commit has been completed (step 246), which signal resumes processing of application program 102 by exiting the wait state (step 292). Thus, application program 102 can use the asynchronous commit function to provide asynchronous and synchronous commits or combinations of both.

FIGS. 4–8 illustrate a more detailed implementation of the present invention described above. This implementation is provided by IBM's Virtual Machine/Enterprise Systems Architecture operating system version 1, release 1.1, which system is disclosed in a publication entitled IBM Virtual Machine/Enterprise Systems Architecture General Information, published July 1991 by IBM Corporation, order number GC24-5550-02.

Figure 4:
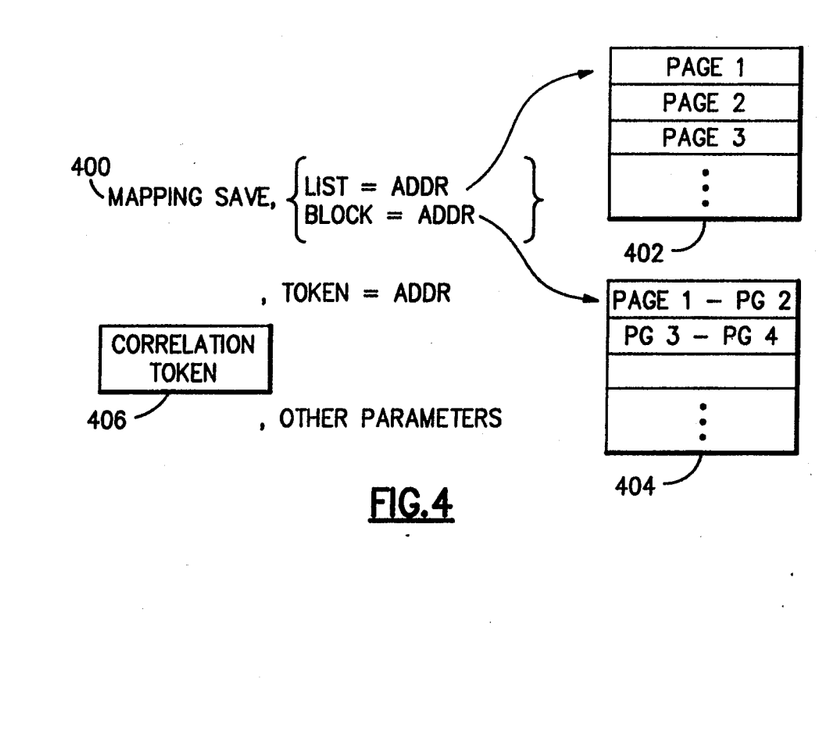
FIG. 4 illustrates formats for parts of calls to the asynchronous commit function of FIG. 2.

The application program 102 calls the asynchronous commit function 114 via a macro interface 400 called "Mapping Save" illustrated in FIG. 4. Interface 400 supports a List or Block format for the call. With the List format, a List parameter specifies a storage block address 402 that contains a list of changed pages in virtual storage 16 (which addresses are mapped to application's DASD 24) whose contents are to be written on the application's DASD 24 pursuant to the commit. Alternatively, with the Block format, a Block parameter specifies a storage block 404 address that contains a set of contiguous ranges of changed pages in virtual storage 106 whose contents are to be written on the application's DASD 24. The following describes the operation of the present invention when the List format is used, but if the Block format is used., the only difference is that each location in a contiguous range of memory locations is processed as if it were specified individually in a list-form at the time of the call.

With the call to the asynchronous commit function 114, the application program also specifies a correlation token 406 to identify the commit request. This token is recorded by the operating system 14 and is presented to the application program 102 by the operating system 14 in step 246 when the operating system notifies the application program 102 of the completion of the asynchronous commit operation. Because one application program can have multiple commit requests outstanding at the same time, this token is necessary to inform the application program which commit operation has just completed. The following parameters are also specified: a parameter indicating the virtual storage address space or spaces for which the commit operation is to be performed (for the purpose of specifying the address spaces containing pages to be committed), a count of the total number of list or block entries, and the address of a temporary storage area for use by the instructions generated by the macro instruction.

Figure 5:
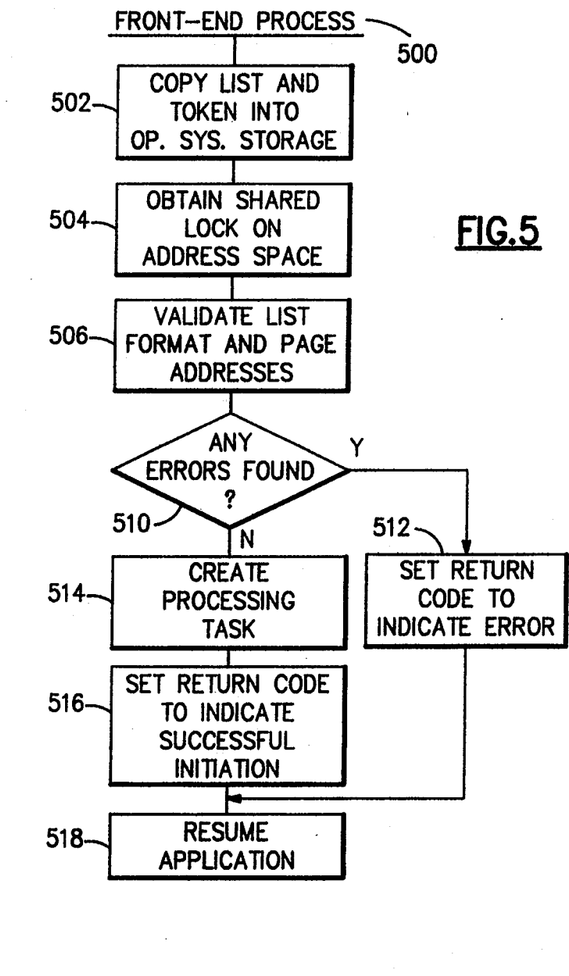
FIG. 5 is a flow chart illustrating a front end processing function of the asynchronous commit function of FIG. 2.

When the application program 102 calls the asynchronous commit function using the macro interface 400, control is passed to a front-end process 500 illustrated in FIG. 5 of the asynchronous commit function. The front end process 500 runs synchronously with respect to the application program 102, in the illustrated embodiment, on the same operating system thread in the multitasking operating system such that the operating system does not execute the application program 102 while the operating system is performing the front end process. (The front end process 500 is executed as if it were a subroutine called by the application program.)

Front end processing begins at step 502 by copying from working storage into operating system storage the list of application pages to be saved. This copy is made to prevent the application program 102 from changing the list once validation has been completed and processing has begun. This copy is used thereafter whenever the operating system needs to refer to the list of pages specified in the commit request. The application-supplied correlation token 406 is also copied into operating system storage, for use later when completion of the commit operation is signaled.

In the preferred embodiment of the present invention, application programs such as program 102 are given access to multiple application virtual storage address spaces such as 106, and such address spaces may be dynamically created and destroyed by the application programs. Therefore, the front end process 500 obtains a shared lock on virtual storage address space 16 which is the target of the present request (step 504) to prevent it from being destroyed while the front-end processing is in progress.

The copy of the list of pages to be saved made during step 502 is scanned in step 506 to validate that it is in the correct format, and also to verify that all of the page addresses specified in the list are contained within the application's virtual storage address space 16. Upon completion of the validation, the front end process 500 determines if any errors were detected during the validation, and if so decision block 510 leads to step 512 in which the front end process sends a return code to indicate the nature of the error(s) and returns control to the application program 102 (step 518). However, if no errors were detected in the validation of step 506, then decision block 510 leads to step 514 in which the front end process creates an operating system task (thread) to process the list of pages to be saved; this thread performs the process illustrated in FIG. 6 and described below. After step 514, the front end processing sends a return code indicating successful initiation of the commit request (step 516), and returns control to the application program 102 (step 518). Then the application program 102 can continue execution concurrently with the execution of the operating system thread created in step 514.

Figure 6:
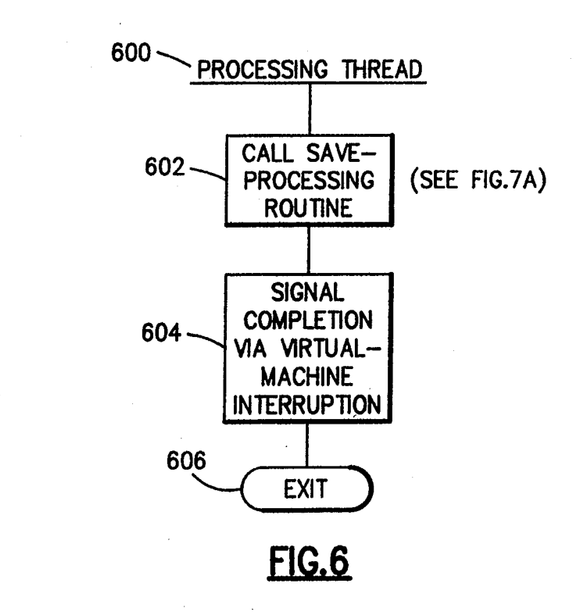
FIG. 6 is a flow chart illustrating a processing thread created by the asynchronous commit function of FIG. 2 to participate in the asynchronous commit operation.

FIG. 6 illustrates the processing performed by the operating system thread 600 created in step 514 of FIG. 5. This thread is termed the processing task. In step 602, the processing task calls a "save-processing" routine 700 illustrated in FIG. 7A to save on the application's DASD 24 the contents of all pages specified in the commit-initiation request. This call to the save-processing routine does not return control until all I/O operations associated with the commit operation are completed.

Figure 7A:
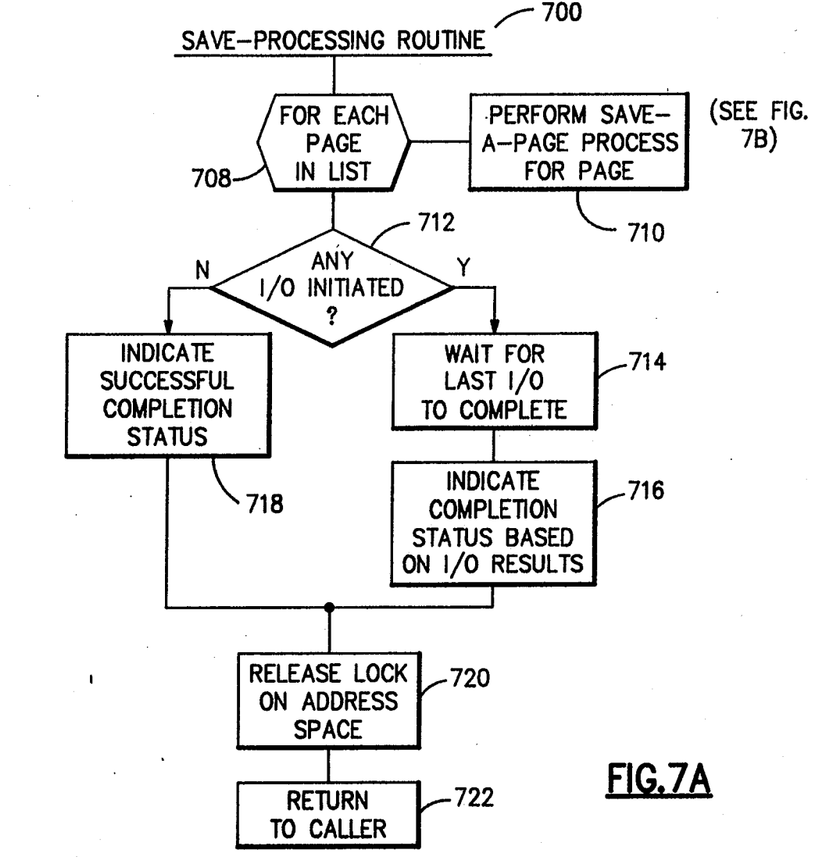
FIG. 7A is a detailed flow chart of a save-processing routine within the asynchronous commit function of FIG. 2.

The save-processing routine begins with step 708 in which the save-processing routine performs an iterative loop calling a save-a-page process (step 710) once for each page specified in the list of pages to be saved. The save-a-page process is shown in detail in FIG. 7B and described below.

When the save-a-page loop of step 708 is completed and the save-a-page process 710 has been performed for all of the pages specified in the commit request, a check is made (decision 712) to determine whether the repeated invocation of the save-a-page process resulted in the scheduling of any I/O operations to write to the application's DASD 24. It may be that all of the application's DASD blocks corresponding to the pages specified in the commit request already contained the most recent copy of the data, for example because they were already updated via a previous commit operation, in which case such pages would not be rewritten to application's DASD 24. If one or more pages require the scheduling of I/O, then the save-processing routine waits (step 714) for the last of these I/O operations to be performed. This completion is signaled in step 822 of FIG. 8 described below. When the last of the I/O operations is performed, the successful or unsuccessful completion status of the commit request is set (step 716) based on the individual error status accumulated by the I/O completion routine shown in FIG. 8. If all I/O completed successfully, then successful completion of the commit request is indicated; otherwise, unsuccessful completion of the commit request is indicated and one or more pages in error are identified in step 716.

Referring back to decision block 712, if the processing of the pages specified in the commit request completed without requiring any I/O to be initiated, then successful completion of the commit request is indicated in step 718. In both cases, (following steps 718 and 716), the address-space lock obtained in step 504 is released (step 720) and the save-processing routine concludes by returning to its caller (step 722).

Figure 7B:
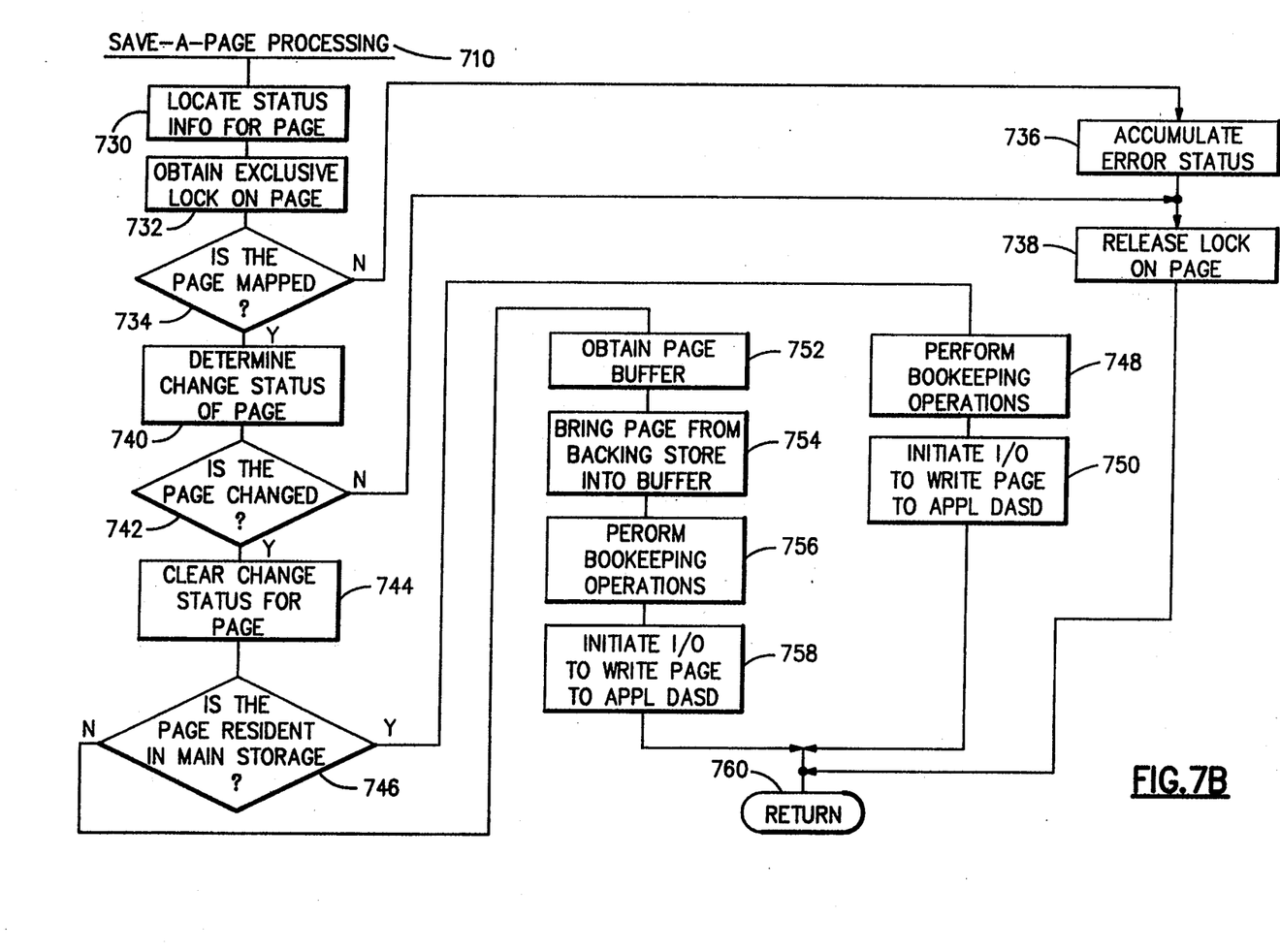
FIG. 7B is a detailed flow chart of a save-a-page processing component of the asynchronous commit function of FIG. 2.

FIG. 7B depicts the save-a-page processing that is performed (via the loop 708 and 710 of FIG. 7A) for each page that is to be saved. As is ordinarily done in a virtual-storage system, the operating system 14 maintains for each virtual-storage page a collection of status and other information. This information includes an exclusive-access lock for the page, indications of whether the page is currently resident in main storage or backing storage and if so, at what locations, an identification of the block on the application's DASD 24 to which the page is mapped, the logical change status of the page with respect to the copy on the application's DASD 24, and other fields and status indications relevant to the virtual-storage paging subsystem 110. The save-a-page process begins at step 730 by locating the status information related to the page being saved. The exclusive-access page lock for the current page is then obtained (step 732). As is usual in lock management techniques, obtaining this lock may involve a delay to wait for the current holder of the lock to release it. The exclusive-access page lock is obtained to prevent other functions of virtual-storage paging subsystem 110 from operating on this page while it is in the process of being committed. Additionally, holding this lock prevents other concurrent commit operations from operating on this page while it is being committed by the present commit operation. Once the lock for the current page has been obtained, a check is made to verify that the page is a mapped page (decision block 734) and if not, the error situation is noted in the accumulation of error status for the commit operation (step 736), the exclusive-access lock for the page is released (step 738) and the save-a-page processing is completed for the current page and returns to the save-processing routine (step 760). The processing loop at step 708 of FIG. 7A continues with the next page to be committed, if there is one, or proceeds to step 712 of that figure if the last page has been handled.

Referring again to decision block 734, if the page is a mapped page, a determination is made of the logical change status for the page with respect to the copy presently on the application's DASD 24. That is, it is determined if there is a copy of the page either in main storage or back-up storage 18 or system paging DASD 22 (or other components of a paging hierarchy not shown) that contains more recent data than the contents of the associated block on the application's DASD 24. If there is such a copy, the page is considered changed. Consistent with well-known techniques for virtual-storage management, this determination is made through the inspection of hardware change bits for the page if it is resident in main storage in conjunction with other operating-system change status bits maintained for the page. It will be recognized by those skilled in the art that various known extensions to virtual storage management techniques can be applied in conjunction with the present invention. For example, an operating system may support a hierarchy of paging devices of varying speeds, and it may write unchanged pages onto paging devices in order to gain advantages such as availability on a faster medium or blocked page reads. In such cases, multiple copies of an application's data page may exist in main storage and/or at different levels of the paging hierarchy at any one time. As is usual practice, the operating system must maintain indications of change status for each instance of the page, with respect to the instance from which it was derived. These embellishments do not materially delay the commit procedure because the available change information can always be used to determine which is the most recent instance and whether it is changed with respect to the copy on the application's DASD 24. If the determination in step 740 indicates that the page is not changed with respect to the copy currently on the application's DASD 24 (decision block 742), then no I/O operation needs to be initiated for the current page, the exclusive-access lock for the page is released (step 738) and the save-a-page processing is completed for the current page (step 760). The processing loop of steps 708 and 710 of FIG. 7A continues with the next page to be committed, if there is one, or else proceeds to step 712 if the last page has been handled.

If the determination in step 740 indicates that the page is changed, then decision block 742 leads to step 744 in which the logical change status for the page is cleared, that is, set to indicate that the page is not changed. This logical change status is set in this manner so that any changes made by the application program 102 after the commit is requested are preserved. This logical status must be cleared before any I/O operations are initiated for the page. Similar to the processing required at step 740 and consistent with known techniques, this clearing may require the resetting of a hardware change bit for the page if it is resident in main storage, as well as resetting of operating-system change status maintained for the page.

Figure 8:
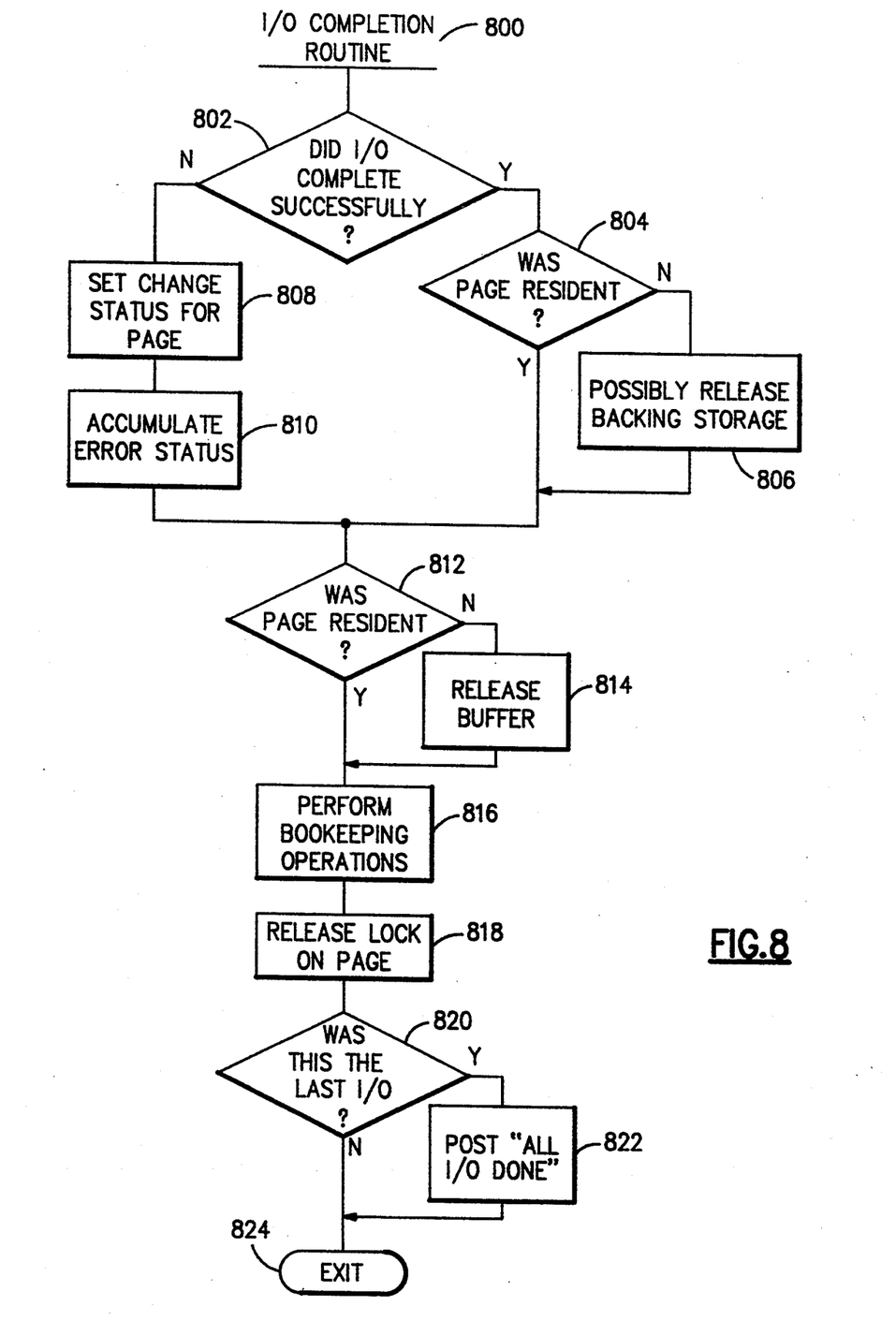
FIG. 8 is a detailed flow chart of an I/O completion routine of the asynchronous commit function of FIG. 2.

Processing proceeds in a manner that depends on whether the page is currently resident in main storage or not. If the page is resident in main storage (decision 746), certain bookkeeping functions of virtual-storage paging subsystem 114 not materially related to the present invention may need to be performed (step 748) such as temporarily marking the page as "in transit" by the paging subsystem, and then the paging subsystem I/O routine 116 illustrated in FIG. 1 is invoked (step 750) to initiate an I/O operation to write the contents of the main storage frame onto the associated block of the application's DASD 24. Operating system 14 provides the paging subsystem routine 116 with the address of the main storage block to be written and the address of an I/O completion routine to invoke when the I/O operation is completed. For all the invocations of this routine 116 (step 750 described above and step 758 described below and indicated in FIG. 7B) the operation of the I/O completion routine is shown in FIG. 8 and described below. The paging subsystem I/O routine 116 determines the location of the application's DASD block on which to write using status information associated with the page. After initiating the I/O operation for this resident-page case, the save-a-page processing is complete for the current page (step 760). The processing loop in steps 708 and 710 of FIG. 7A continues with the next page to be saved, if there is one, or else proceeds to step 712 if the last page has been handled.

Referring again to decision block 746, if the current page is not resident in main storage, then it resides in back-up storage 18, system paging DASD 22 or elsewhere in the operating system's paging hierarchy. A temporary main-storage buffer is obtained for the page (step 752) and the contents of the page are brought into the buffer from the backing storage (step 754) using the paging subsystem I/O routine (if the page is on paging DASD) or CPU instructions for accessing the back-up RAM (if the page is on back-up RAM). It may be necessary to perform certain virtual-storage paging subsystem 114 bookkeeping functions not materially related to the present invention (step 756) such as temporarily associating the buffer with the virtual-storage page and marking it as "in transit", and then the paging subsystem I/O routine 116 is invoked (step 758) to initiate an I/O operation to write the contents of the temporary main storage buffer on the appropriate block of the application's DASD 24. After initiating the I/O operation, the save-a-page processing is complete for the current page (step 760).

FIG. 8 illustrates the processing performed by the I/O completion routine specified in the invocation of the paging subsystem I/O routine 116 in steps 750 and 758 of FIG. 7B. This routine is entered once for each page for which an I/O operation is initiated. Parameters passed to the I/O completion routine indicate the page for which completion is being indicated and the successful or unsuccessful completion of the I/O operation. Each invocation runs on a distinct operating system thread different from the thread on which the processing of FIGS. 6, 7A and 7B runs. The processing of the I/O completion routine begins at decision block 802 by checking the successful or unsuccessful completion of the I/O operation. If the I/O operation completed successfully then a check is made whether the page being saved was originally resident in main storage or not (decision block 804). If the page was not originally in main storage, then decision block 804 leads to step 806 in which the backing storage locations allocated for the page are indicated as available for release (step 806). However, consistent with well-known techniques, it may be advantageous for the operating system to retain the backing storage locations for the page, for example because they provide faster access than the application's DASD 24.

Referring again to decision block 802, if the I/O operation was not successful, then the logical change status for the page is set to indicate that the page is changed (step 808), and the error situation is noted in the accumulation of error status for the commit operation (step 810). The change status for the page is set to "changed" to preserve the application program's changed data. If the change status were left as "unchanged" as set in step 744 in FIG. 7B, the operating system 14 might, in the course of normal virtual-storage management, discard the main storage or backing storage copy of the page before it was ever successfully written on the application's DASD 24. By resetting the change status to "changed" the application program 102 can recover from the error by mapping the page to a different block on the application's DASD 24 and then initiating another commit operation to save the page. This subsequent commit operation will find the page marked as "changed" and therefore initiate I/O to write the page to the newly-mapped block.

Regardless of the result of the decision block 802, decision block 812 is eventually executed in which it is determined if the page for which I/O completion is being processed was originally resident in main storage. If not, the temporary main storage buffer allocated for the page is released (step 814). After step 814 or if the page was resident in main storage, certain bookkeeping functions of virtual-storage paging subsystem 114 are performed if necessary (step 816). These bookkeeping functions include marking the page as no longer "in transit". Next, the exclusive-access lock on the page obtained in step 732 of FIG. 7B is released (step 818). This allows other virtual-storage paging subsystem functions to operate on the page. Also, releasing this lock allows other concurrent commit operations to operate on this page if so requested. Note, however, that if the application program 102 has not further changed the page since the time the logical change status for the page was cleared in step 744 of FIG. 7B, subsequent commit operations for the page will not need to perform any I/O operations for the page. (See again decision block 742 or FIG. 7B.).

Next a check is made whether the present invocation of the I/O completion routine is for the last outstanding I/O operation for the commit request. If so, decision block 820 leads to step 822 in which the I/O completion routine posts an indication that all I/O is complete. This allows the processing routine to proceed past the waiting step indicated at 714 of FIG. 7A. This synchronization between the save-processing task and the I/O completion task can be accomplished in many well-known means, such as event control blocks, semaphores, or other task-synchronization mechanisms available within the operating system 14. The processing of the present invocation of the I/O completion routine is now finished, so the routine exits to the operating system (step 824).

When the save-processing routine regains control from the wait at step 714 (which occurs when the I/O completion routine posts at step 822 that all I/O is complete), it proceeds through steps 716 and 720 (previously described) and returns to the processing task illustrated in FIG. 6 (step 824).

When the save-processing routine returns control, the processing task signals to the application program 102 (step 604) that asynchronous commit operation is complete. Provided in the completion signal is the correlation token supplied by the application program when it initiated the asynchronous commit operation and which was saved by the operating system 14 in step 502. Also provided in the completion signal is status information regarding the successful or error completion of the I/O operations associated with the commit operation. This status information is derived from error status accumulated by the save-processing routine. In the Virtual Machine/Enterprise Systems Architecture implementation of the invention referenced above, the completion signal is presented by means of a virtual-machine external interruption.

After signaling the application program 102, the processing task exits (step 606) causing the operating system thread to be deleted.

In the implementation of system 10 described above, each invocation of the paging subsystem I/O routine 116 initiates a single I/O operation, and the completion of each I/O operation results in a separate invocation of the I/O completion routine shown in FIG. 8. However, this need not be the case. If desired, multiple I/O operations can be scheduled by a single invocation of the paging subsystem I/O routine 116 (by passing lists of pages to be written out), and allowing a single invocation of the I/O completion routine to signal the completion of multiple I/O operations (again, via lists of pages) for virtual-storage management. In certain situations, the application program 102 may not wish to proceed until a requested commit operation is complete. For example, in application programs that utilize a periodic checkpoint scheme, it is usually the case that once the checkpoint process is initiated, the application program can not proceed until the checkpoint-related commit operations are complete. As has been described above, such an application program can be implemented using the asynchronous commit function 114 described above and the application program suspends itself immediately upon return from the validation phase and resumes itself when the completion signal is received.

However, an extension to the present invention improves efficiency for such application programs by eliminating the need for the operating system to return control to the application program after the validation phase only to have the application program immediately suspend itself. The operating system interface shown in FIG. 4 is extended to add an additional parameter by which the application program 102 requests either synchronous or asynchronous commit operation. If the application program 102 elects asynchronous operation then the commit function proceeds asynchronously as previously described.

However, if the application program 102 requests synchronous commit operation then the commit function proceeds according to the prior art, i.e. the commit interface does not return control to the application program until the entire commit process has been completed. In such a case, because completion of the commit operation is indicated by control returning to the application program 102, there is no need for a completion signal as in the asynchronous case. Any completion status information can be supplied as return codes upon return from the commit interface.

Figure 9:
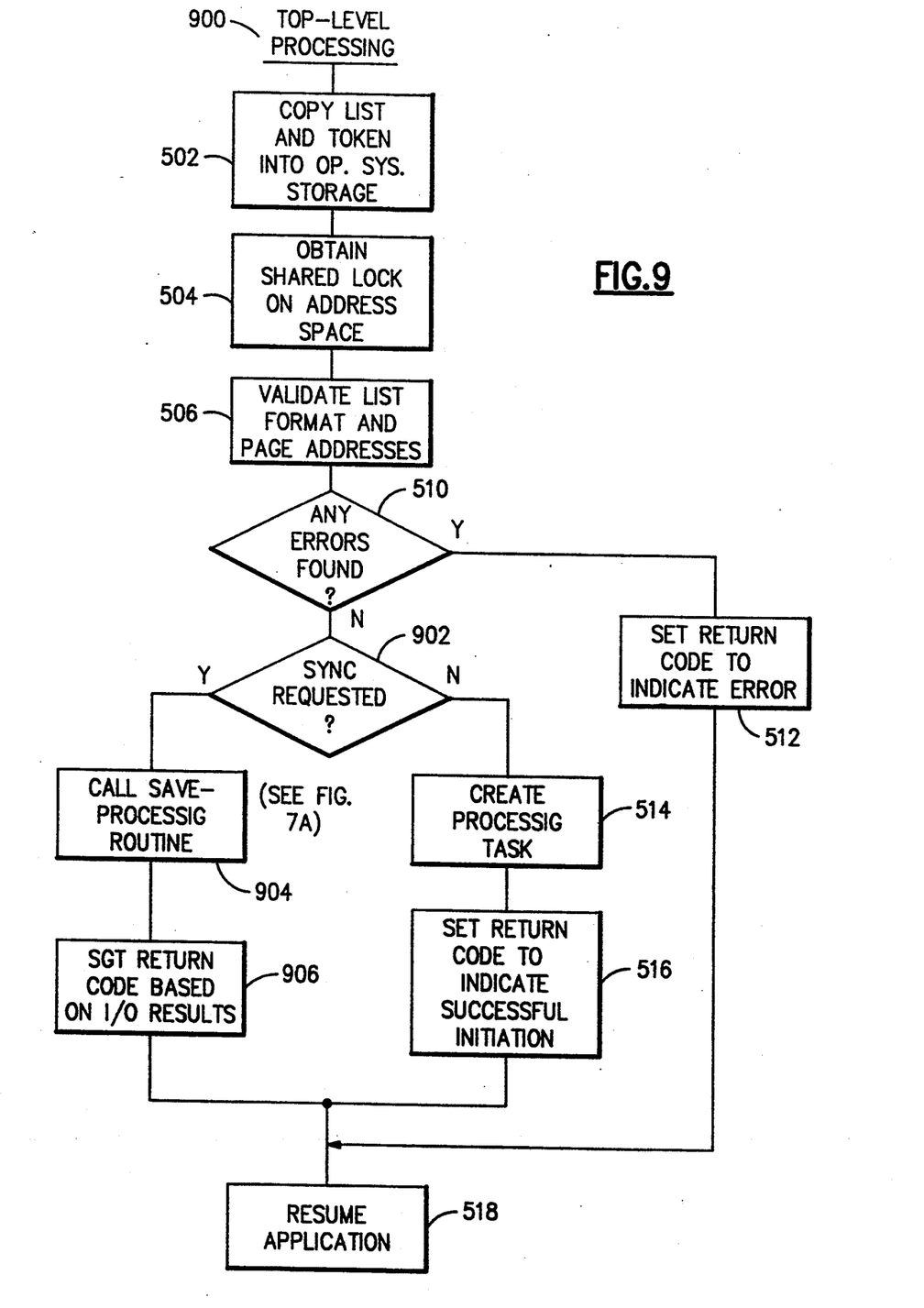
FIG. 9 is a modified version of FIG. 5 that illustrates top-level save processing for both synchronous and asynchronous versions of the commit function.

FIG. 9 illustrates a modification to the processing shown in FIG. 5 to implement the foregoing synchronous option. Steps 502 through 518 are the same as those shown in and described for FIG. 5. Regardless of whether synchronous or asynchronous processing is requested, steps 502, 504, 506 and decision 510 are executed. If there are no errors found (decision 510) and asynchronous processing is requested (decision 902), steps 514, 516 and 518 are executed as previously described for FIG. 5.

However, when synchronous processing is requested, decision 902 leads to step 104 in which the operating system directly calls the save-processing routine (step 904) shown in FIG. 7A. The save-processing routine runs on the same operating-system task as the application program, and therefore the application program remains suspended while this processing is taking place. Upon completion of the save-processing routine, a return code is set based upon the results of the I/O operations initiated by the save-processing routine (step 906) and the application program 102 is resumed (step 518).

Based on the foregoing, a computer system according to the present invention has been disclosed. However, numerous modifications and substitutions can be made without deviating from the scope of the present invention. Therefore, the invention has been disclosed by way of illustration and not limitation, and reference should be made to the following claims to determine the scope of the present invention.

We claim:

1. A computer system for processing and committing data, said computer system comprising:
   a processor;
   a storage device coupled to and located externally to said processor for storing committed data;
   a virtual or actual working memory, located internally or tightly coupled to said processor or at least accessible by said processor with greater speed than said processor can access the external storage device;
   means for receiving from an application program executing on said processor requests to write data into said memory and commit said data;
   operating system means, responsive to said commit request, for determining which of said data or blocks of said data have been changed in said memory, supplying to an I/O service an identification of the changed data or blocks to cause said I/O service to write said changed data or blocks to said external storage device and permitting said application program to process other data of an unrelated transaction while the changed data or blocks are being written to said external storage device.

2. A computer system as set forth in claim 1 wherein said working memory is provided by a virtual storage by which said application program addresses actual memory.

3. A computer system as set forth in claim 2 further comprising means for permitting said application program to establish a mapping between locations represented by said virtual storage to corresponding locations in said external storage device.

4. A computer system as set forth in claim 1 wherein said operating system means initially validates the commit request and subsequently causes said I/O service to write said changed data or blocks to said external storage device only if said commit request is valid, and during the validation of said commit request all or substantially all or said application program is suspended.

5. A computer system as set forth in claim 4 wherein the operating system means includes means for resuming said application program after validating the commit request, whereby any part or all of said application program which was suspended during the validation of said commit request can be resumed before or during the writing of said data to said external storage device.

6. A computer system as set forth in claim 1 wherein the operating system means also supports synchronism with said application program such that said program can suspend itself entirely or substantially entirely during validation of the commit request and the writing of the changed data or blocks to said external storage device.

7. A computer system as set forth in claim 6 wherein the operating system means supports said synchronism by said application program for a commit request which precedes another commit request by said application program in which at least part of said program is permitted to continue processing while the changed data or blocks are written to said external storage device.

8. A computer system as set forth in claim 7 further comprising
   back-up storage means for backing-up said working memory when said working memory is overloaded; and wherein said other commit request implemented before the synchronous commit request reduces the likelihood that the data to be committed by said synchronous commit request has been written to the back-up storage means.

9. A computer system as set forth in claim 1 wherein said external storage device is a magnetic disk or DASD or magnetic tape.

10. A computer system as set forth in claim 1 wherein said operating system means includes means for sending a completion signal to said application program after the changed data or blocks have been written to the external storage device, whereby any part of said application program which was suspended on account of said commit request can be resumed.

11. A computer implemented method for committing data, said method comprising the steps of:
   executing a request of a first program to map virtual or actual memory to an external storage device;
   executing a request of said first program to update data in said memory;
   executing a request of said first program to commit the updated data by invoking a second program to manage writing of the data to the external storage device; and
   while the data is being written to said external storage device, continuing to execute said first program to perform an unrelated transaction.

12. A method as set forth in claim 11 wherein the step of executing the commit request includes the step of validating the commit request before the writing of said data to said external storage device, and further comprising the step of ceasing to execute said first program while the commit request is being validated.

13. A method as set forth in claim 12 further comprising the steps of:
   executing a second request of said first program to commit data after the first said request to commit data by invoking said second program to manage writing of the data to said external storage device; and
   while said data is being written to said external storage device pursuant to said second request to commit data, ceasing to execute said first program.

14. A method as set forth in claim 13 wherein said second request to commit data is made at a check point of said first program, and the first said request to commit data is made before said check point but after a previous checkpoint of said first program.

15. A computer system as set forth in claim 1 wherein said unrelated transaction is an update to other data or blocks that are not being written to external storage.

16. A computer implemented method for committing data, said method comprising the steps of:
   executing a request of a first program to update data in a virtual or actual working memory;
   executing a request of said first program to commit the updated data by invoking a second program to manage writing of the data to an external storage device; and
   while the data is being written to said external storage device, continuing to execute said first program to perform an unrelated transaction.

17. A method as set forth in claim 16 wherein said unrelated transaction is a same type as the data update.

18. A method as set forth in claim 11 wherein said unrelated transaction is a same type as the data update.

* * * * *